(12) United States Patent
Merelli (10) Patent No.: US 12,313,374 B2
(45) Date of Patent: May 27, 2025

(54) ONE-PIECE GUNSTOCK OF ADVANCED COMPOSITE MATERIAL FOR FIREARM AND MANUFACTURING METHOD THEREOF (71) Applicant: Sabatti S.p.A., Gardone Val Trompia (IT)

(72) Inventor: Bernardino Merelli, Parre (IT)

(73) Assignee: Sabatti S.p.A., Gardone Val Trompia (IT)

( * ) Notice: Subject to any disclaimer, the term of this patent is extended or adjusted under 35 U.S.C. 154(b) by 0 days.

(21) Appl. No.: 18/684,576

(22) PCT Filed: Aug. 25, 2022

(86) PCT No.: PCT/EP2022/073719
§ 371 (c)(1),
(2) Date: Feb. 16, 2024

(87) PCT Pub. No.: WO2023/031021
PCT Pub. Date: Mar. 9, 2023

(65) Prior Publication Data
US 2024/0263913 A1    Aug. 8, 2024

(30) Foreign Application Priority Data
Aug. 30, 2021  (IT) .................. 102021000022535

(51) Int. Cl.
*F41C 23/18*     (2006.01)
*B29C 35/02*     (2006.01)
(Continued)

(52) U.S. Cl.
CPC .......... *F41C 23/18* (2013.01); *B29C 35/0227* (2013.01); *B29C 70/44* (2013.01);
(Continued)

(58) Field of Classification Search
CPC ...................................... F41C 23/18
See application file for complete search history.

(56) References Cited

U.S. PATENT DOCUMENTS

| | | | |
|---|---|---|---|
| 6,427,372 B1 * | 8/2002 | Howard | F41C 23/18 42/71.01 |
| 7,716,864 B2 * | 5/2010 | Skrubis | F41A 3/66 42/71.01 |
| 7,726,060 B1 | 6/2010 | Jones | |

FOREIGN PATENT DOCUMENTS

| | | |
|---|---|---|
| GB | 2485166 A | 5/2012 |
| RO | 129849 A2 | 10/2014 |

OTHER PUBLICATIONS

International Search Report dated Oct. 25, 2022 issued in connection with PCT/EP2022/073719.
(Continued)

Primary Examiner — Reginald S Tillman, Jr.
(74) Attorney, Agent, or Firm — Akerman LLP (57) ABSTRACT

A one-piece gunstock for firearm and the relevant manufacturing method are described, said one-piece gunstock being composed of a frame (1) having two half-shells (1a, 1b) extended longitudinally and defining a recess inside the frame (1), a plurality of seats (31,32) and a space (42) for housing respective mechanical components formed between said half-shells and delimited by a transversal structural connection element (33) of said half-shells (1a, 1b), characterized in that said half-shells (1a, 1b) and said transversal connection element (33) are made in a single piece of an advanced composite material by a vacuum-bag moulding technology.

15 Claims, 4 Drawing Sheets (51) Int. Cl.
  *B29C 70/44* (2006.01)
  *B29K 63/00* (2006.01)
  *B29K 105/08* (2006.01)
  *B29K 307/04* (2006.01)
  *B29L 31/00* (2006.01)

(52) U.S. Cl.
  CPC ...... *B29K 2063/00* (2013.01); *B29K 2105/08* (2013.01); *B29K 2307/04* (2013.01); *B29L 2031/777* (2013.01)

(56) References Cited

OTHER PUBLICATIONS

Written Opinion dated Oct. 25, 2022 issued in connection with PCT/EP2022/073719.

* cited by examiner

ONE-PIECE GUNSTOCK OF ADVANCED COMPOSITE MATERIAL FOR FIREARM AND MANUFACTURING METHOD THEREOF

CROSS-REFERENCE TO RELATED APPLICATIONS

This application is a national phase of PCT/EP2022/073719, filed Aug. 25, 2022, and claims priority to Italian Patent Application No. 102021000022535, filed Aug. 30, 2021, the entire contents of both of which are hereby incorporated by reference.

FIELD OF APPLICATION

In its more general aspect, the present invention relates to the field of firearms.

In particular, the present invention relates to a one-piece gunstock of a firearm such as particularly, but not exclusively, a rifle and the like, totally made of advanced composite material, preferably a material comprising carbon fibre, and a manufacturing method thereof.

Prior Art

As it is known, gunstocks for firearms not made of wood, such as for example rifles or the like, comprise an internally hollow external frame having two half-shells, respective seats or recesses being defined therebetween for housing the mechanical components needed for allowing firing, such as action components (release assembly, breech bolt and barrel), tanks and firing mechanisms.

It is known that these gunstocks can be made by injection moulding from thermoplastic polymer materials which are melted and shaped by means of moulds suitably designed to obtain the one-piece gunstock or the pieces composing the gunstock which are then suitably assembled and bonded by screws and/or glues.

Gunstocks made in this way have a sufficiently strong structure and substantially steady performances over time compared to traditional gunstocks made of wood.

In order to increase the gunstock lightweight and improve the gunstock mechanical strength, it is also known to make gunstocks by using composite materials comprising fibres, particularly glass fibres or carbon fibres.

However, processing these composite materials by the common injection moulding procedures used for thermoplastic polymer materials proves to be impossible and is unsuitable for making the one-piece gunstock in which the housing seats of the mechanical components are also defined, through the moulding process.

Hence, the use of the above composite materials is usually limited solely to the creation of the gunstock external frame, possibly in a single piece.

Afterwards the structure inside the recess of the so-obtained gunstock frame is created by using resins or other polymer materials which are suitably processed (for example milled and/or adapted) so as to create the shapes needed for housing the rifle mechanical components.

An appropriate coupling of the mechanical components to the gunstock shape and an optimum distribution of the stresses caused by the vibrations generated during firing are thereby ensured.

Patent application RO129849A2 describes a combat rifle having a gunstock consisting of two cases of cast carbon fibre.

Patent application GB 2485166A describes a gunstock for firearms made of a shaped shell of carbon fibre/epoxy resin composite material. The gunstock is preferably moulded in a single piece and the shell has an energy absorbing material such as for example a rubber-based compound interposed between the mechanical components needed for firing and the internal surface of the shell. Application GB 2485166A describes that moulding the gunstock in a single piece also allows to define the external shape of the internal action area where the barrel action is located to ensure a coupling as close as possible between the barrel and the action area thereof so as to transmit more effectively the recoil forces in the energy absorbing material contained in the gunstock.

However, application GB 2485166A does not provide any teaching or suggestion to define, through the moulding process, also the most complex shapes of the seats of the gunstock internal part intended to house other rifle mechanical components.

In the prior art, the assembling and coating with materials such as rubbers or resins of a gunstock for firearm are therefore fundamental operations to ensure an optimum and homogeneous distribution of the stresses caused by the vibrations that are generated in the firearm during firing and hence they require time, precision and skilled labour. Currently these operations are still the steps for manufacturing firearms which are more liable to errors and whose wrong execution, even only partially, considerably affects the distribution of the stresses caused by the vibrations generating in the firearm during firing with serious consequences in terms of fire precision and reliability, firearm structural strength and user comfort.

The main aim of the present invention is to provide a one-piece gunstock for firearm of advanced composite material, preferably a material comprising carbon fibres, which does not need filling materials to ensure the correct positioning and coupling of the mechanical components in the gunstock structure and the homogeneous distribution of the stresses caused by the vibrations that are generated in the firearm during firing.

Another aim of the present invention is to provide a gunstock for firearm which allows a faster procedure for assembling the mechanical components to the gunstock and with a reduced risk of error.

Another aim of the present invention is to provide a method for manufacturing the gunstock for firearm.

SUMMARY OF THE INVENTION

These aims are achieved by a one-piece gunstock for firearm comprising a frame having two half-shells extended longitudinally and defining a recess inside the frame, a plurality of seats and a space for housing respective mechanical components formed between said half-shells and delimited by a transversal structural connection element of said half-shells, characterized in that said half-shells and said transversal structural connection element are made in a single piece of an advanced composite material, preferably a composite material comprising carbon fibres, by a vacuum-bag moulding technology.

Preferably said half-shells and said transversal connection element are made by a vacuum-bag moulding technology and autoclave-curing.

The term one-piece gunstock as used herein means a gunstock manufactured in a single piece by extraction from a single mould i.e. a gunstock without any break between the fibres of advanced composite material composing it.

The term advanced composite material as used herein means any composite material comprising natural and/or synthetic, organic and/or inorganic fibres, among which by way of non-limiting example: flax fibres, aramid fibres such as for example kevlar, glass fibres, polymer fibres, for example polyester fibres, jute fibres, carbon fibres and combinations thereof.

The fibres can be newly manufactured and/or come from recycling (recycled fibres). The advanced composing materials generally comprise a reinforcement composed of said fibres dispersed in a matrix which has mainly a binding/cohesive function of the fibre reinforcement. The matrix can be in particular a polymer matrix such as for example an epoxy resin. Preferably, the fibres of the advanced composing material used in the present invention comprise or consists of carbon fibres.

Structurally this implies that all components composing the gunstock are mutually joined but free from junctions, which cause a weakening of the structure, being produced in the same mould and at the same time.

Advantageously this makes the gunstock structure strong and smooth thus ensuring an optimum distribution of the stresses caused by the vibrations generated during firing.

Structurally the gunstock comprises a frame in which the external walls are shaped so as to ensure an optimum grip of the firearm and in which the internal walls are shaped in terms of shape and thickness depending on the mechanical strength, stiffness and elasticity requirements needed for the different areas of the gunstock structure and depending on the different shapes and functions of the mechanical components to be housed inside the gunstock.

Advantageously this allows the mechanical components to be housed inside the gunstock in direct contact with the gunstock frame itself, without any need for finishes of the frame itself and without any need to interpose filling materials between the mechanical components and the internal surfaces of the gunstock frame.

Advantageously this reduces intrinsically unreproducible manual operations to a minimum, which are needed for assembling the firearm, and it ensures a distribution profile of the stresses caused by the vibrations that are generated during firing which is highly reproducible among the different firearms being manufactured.

In an embodiment the one-piece gunstock for firearm of advanced composite material is a one-piece gunstock for rifle.

Further features and advantages of the present invention will be apparent from the following description of some embodiments given by way of non-limiting example with reference to the attached drawings.

BRIEF DESCRIPTION OF THE DRAWINGS

In the drawings.

For a better understanding and clarity of the figures the elements represented therein could not be in a scale representing reality. Moreover, structurally and/or functionally equivalent elements in the figures will be identified by the same reference numbers.

DETAILED DESCRIPTION

Figure 1:
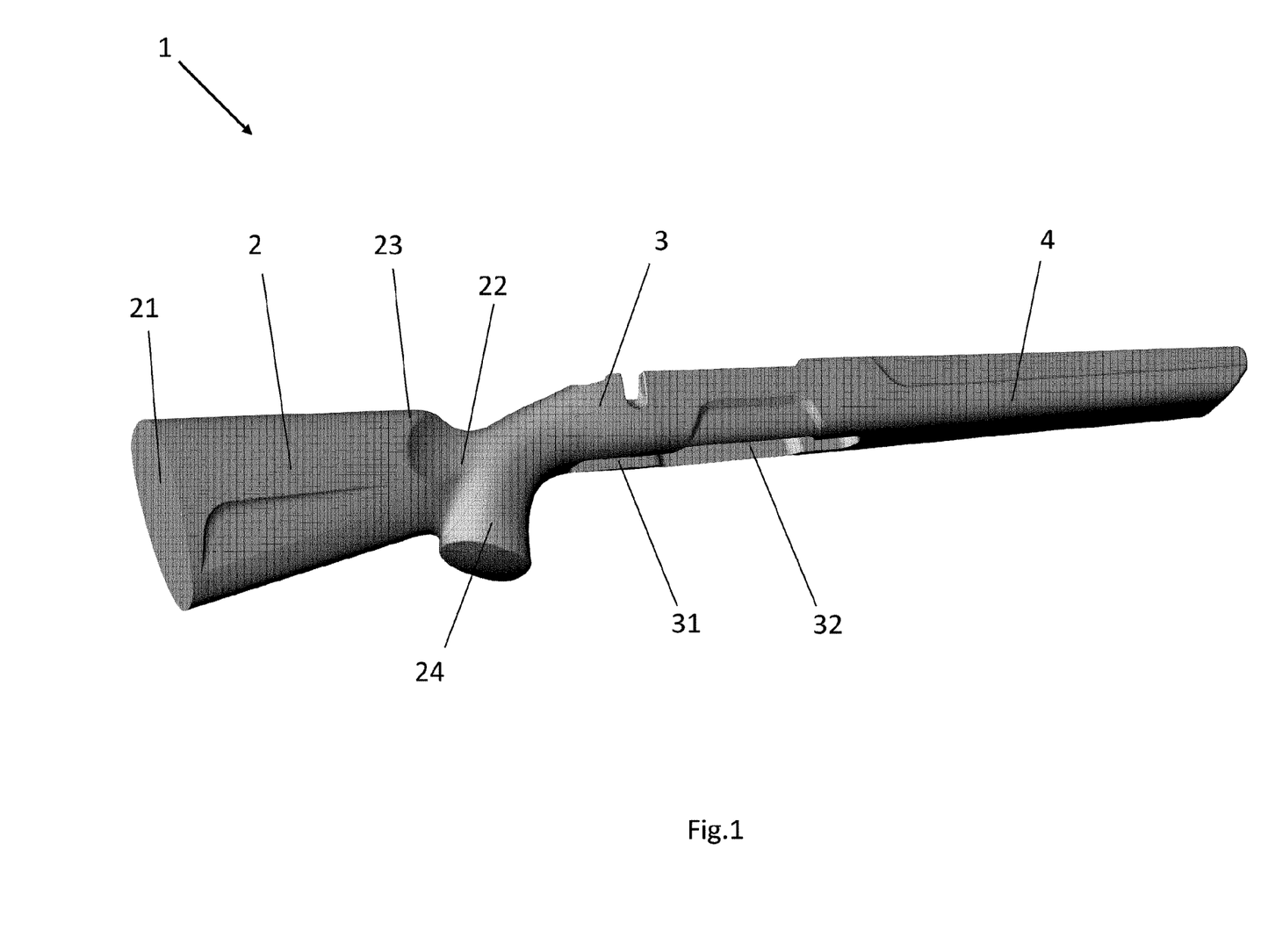
FIG. 1 shows a perspective view of an embodiment of a one-piece gunstock for rifle of advanced composite material according to the invention.
Figure 2:
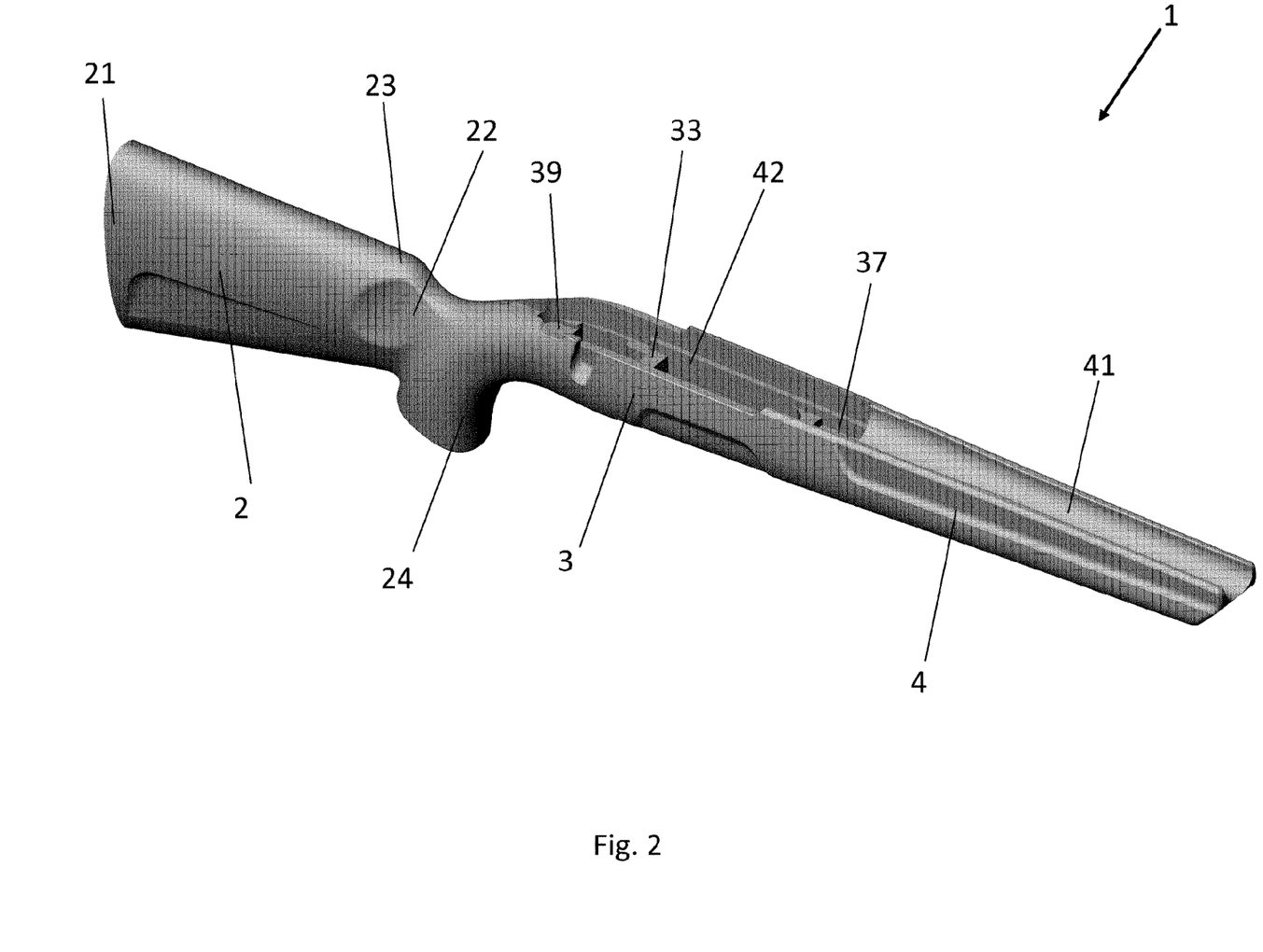
FIG. 2 shows a perspective view of the one-piece gunstock for rifle of FIG. 1 from a different angle.
Figure 3:
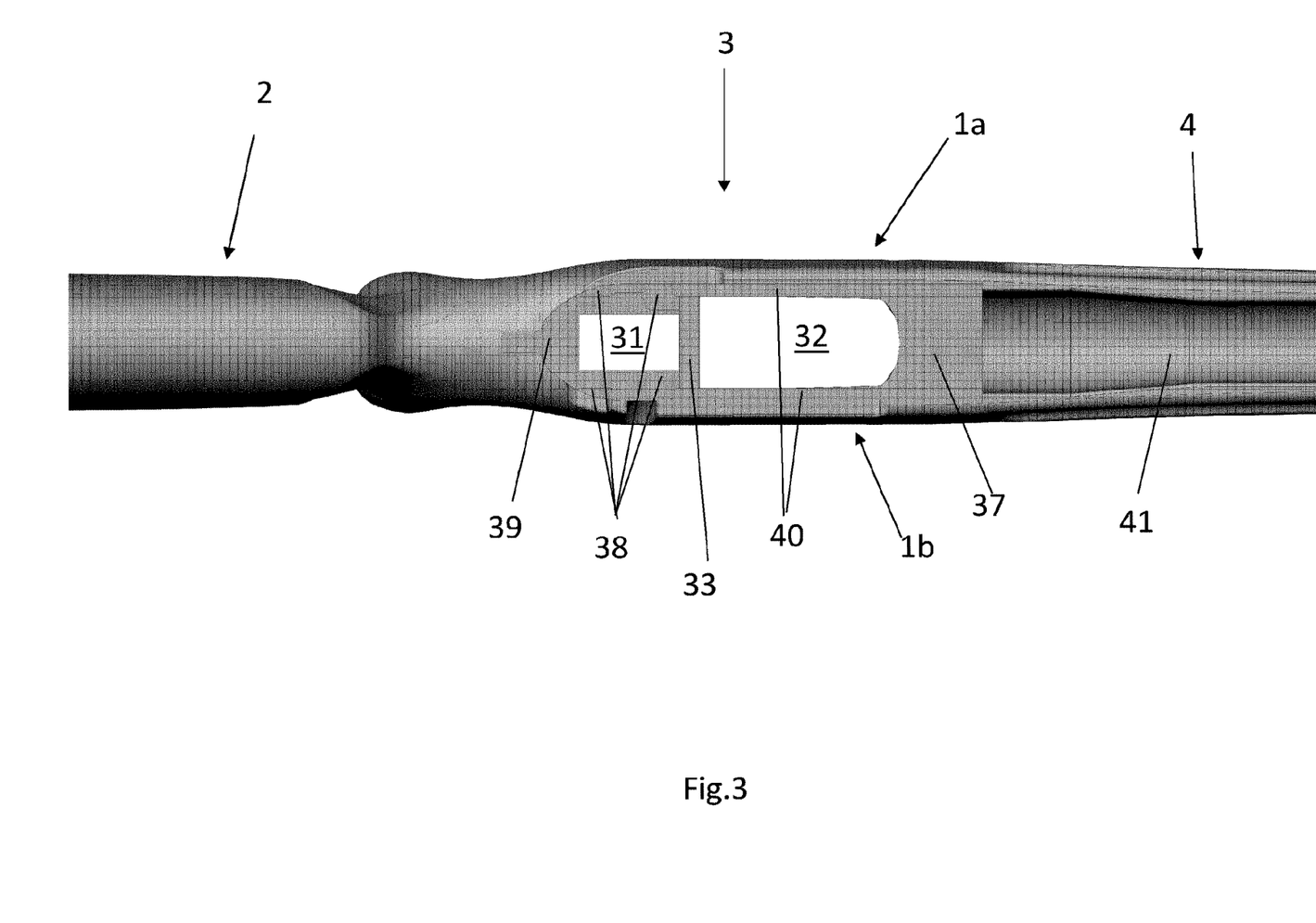
FIG. 3 shows a top view of a detail of the one-piece gunstock for rifle of advanced composite material of FIG. 1.
Figure 4:
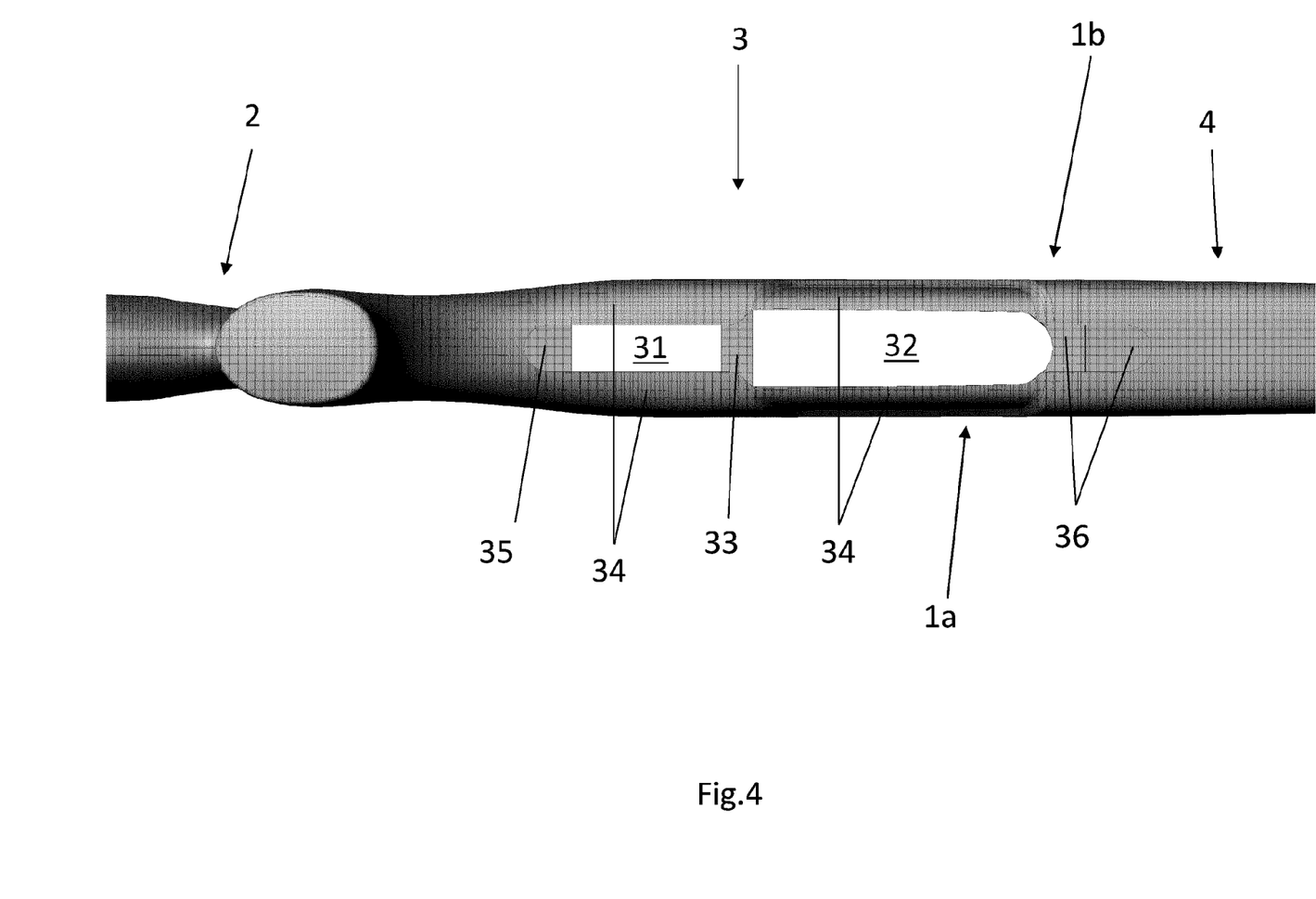
FIG. 4 shows a bottom view of a detail of the one-piece gunstock for rifle of advanced composite material of FIG. 1.

With reference to FIGS. 1-4, a one-piece gunstock for rifle of advanced composite material, preferably a material comprising carbon fibre, according to an embodiment of the present invention, is now described in detail, said one-piece gunstock for rifle being globally indicated with the reference number 1.

The one-piece gunstock for rifle 1 comprises two half-shells 1a and 1b formed in a single piece which are extended longitudinally and define a recess inside the frame. More in detail, the frame has a back portion 2, a central portion 3 (breech box seat) and a front portion 4. The back portion 2 has an open recess towards the back end 21 thereof and tapers towards a front end 22 where it is connected above to a comb 23 and, below, to a grip 24. The central portion 3 is internally shaped with housing seats 31, 32 for housing and fixing respective mechanical components as specified hereafter (not shown in the figures) needed to allow firing. The front portion 4, also referred to as fore-end 4, is instead suitably shaped for housing the barrel (not shown in the figures) and acts as a grip for the non-firing hand.

The recess of the back portion 2 of the frame is adapted to be filled in with an absorbing material, which absorbs the vibrations caused by firing thus improving the user comfort, and it can be closed by a butt plate (not shown in the figures) at the back end 21.

Advantageously this reduces the recoil felt by the user during firing.

The central portion of the frame 3 is internally shaped with housing seats 31, 32 transversely delimited by a structural connection element or transversal flange or crossbar 33 and defined below by bent portions of the two half-shells 1a and 1b of the gunstock forming curbs 34 and laterally by the suitably-shaped internal walls of the half-shells 1a, 1b. The housing seats 31,32 are intended to hold and support mechanical components, such as for example the action, the trigger assembly and the magazine tank, needed for allowing firing and which are fixed to the central portion 3 of the frame by suitable fixing means (not shown), for example screws. The structural connection element 33 is instead adapted to reinforce the connection between the two half-shells 1a and 1b for preventing undesired vibrations from generating during firing due to recoil.

More in detail, the housing seat 31 is delimited below by curbs 34 and it has a back flaring 35. Inside the housing seat 31, the two half-shells 1a and 1b are suitably shaped with opposed longitudinal flanges 38, a transversal back flange 39 and a front flange composed of the above transversal structural connection element 33 so that the housing seat 31 has a shape which is suitable to hold the rifle trigger assembly.

The housing seat 32 is delimited below by the curbs 34 and it has a front flaring 36. Inside the housing seat 32, the two half-shells 1a and 1b are suitably shaped with opposed longitudinal flanges 40, a back flange composed of the above transversal structural connection element 33 and a transversal front flange 37 so that the housing seat 32 has a shape which is suitable to hold the magazine tank (not shown in the figures).

The back flaring 35 and the front flaring 36 are also adapted to support the magazine tank and have holes for allowing the action (trigger assembly, breech bolt and barrel) and the tank to be fixed by fixing means (not shown) such as for example screws.

Moreover, above the housing seats 31 and 32, the one-piece gunstock 1 has a space 42 intended to house the action of the firearm suitably supported by the front flange 37 and by the back flange 39 and anchored thereto by fixing means (not shown), for example assembly screws engaging in respective holes which are present on the back flaring 35 and on the front flaring 36. Moreover, the front flange 37 acts as an action front bearing and includes the recoil lug bearing which prevents the rifle action from moving backward in the gunstock during firing.

The front portion 4 of the frame has a longitudinally elongate shape and an internal recess 41 extended longitudinally and suitably shaped for housing the barrel (not shown).

In accordance with the present invention, the back portion 2, the central portion 3 and the front portion 4 of the frame with the above-described respective structural elements are manufactured as a single piece by extraction from a single mould i.e. without any break between the fibres of advanced composite material composing it, by using a vacuum-bag moulding technology.

A one-piece gunstock for rifle as described above is thereby obtained, which has a high lightweight and strength and ensures an optimum distribution of the stresses caused by the vibrations generated during firing.

Advantageously this implies a high lightweight during transport and high precision and consistency during firing.

The above-described one-piece gunstock according to the invention is obtained according to a vacuum-bag moulding process.

In a first embodiment of the invention, the process comprises the steps of:
providing a mould split into two half-moulds having each a recess with a shape being complementary to the external shape of one of the half-shells of the frame of the one-piece gunstock to be manufactured;
arranging at least one sheet of an advanced composite material comprising fibres and a resin in one of the half-moulds so as to fill in the recess of said half-mould without projecting therefrom;
arranging at least one sheet of an advanced composite material comprising fibres and a resin in the other half-mould so as to fill in the recess of the other half-mould and project from said recess;
inserting into said other half-mould at least one bag having an open end portion projecting from said other half-mould;
inserting into said other half-mould at least one shaped insert being adapted to define internal recesses of the frame of the gunstock to be manufactured;
coupling said half-moulds, keeping said open end portion of at least one bag outside the resulting mould and thereby obtaining the overlap of the sheets of advanced composite material arranged in said half-moulds;
inserting said mould into a vacuum bag and arranging said open end portion of at least one bag in communication with the outside;
generating vacuum in said vacuum bag so as to extract air from said mould;
curing the resin of the sheets in the mould kept under vacuum and generating a pressure inside at least one bag through said open end portion thereof in communication with the outside so as to compact the sheets inside the mould, thus obtaining said one-piece frame;
extracting said one-piece frame from the mould.

Preferably, the advanced composite material comprises carbon fibres and an epoxy resin.

In the above-described process a single bag or a plurality of bags can be employed, preferably in communication with each other and in communication with the outside individually or collectively through an open end portion of one of them. Each bag can be made of any suitable material, for example silicone. Preferably, the at least one bag (for example as a single bag or a plurality of bags communicating with each other) is arranged on most of or substantially along the whole longitudinal extent of said half-moulds.

In the process according to the first embodiment of the invention, applying vacuum in the vacuum bag together with the pressure exerted on the sheets by the at least one bag in pressure communication with the outside of the mould under vacuum advantageously allows the sheets inside the mould to be compacted while preventing air bubbles from forming between the sheets of advanced composite material or removing possible already-formed air bubbles which would otherwise create imperfections in the final product affecting the quality thereof.

In a second embodiment, the above-described one-piece gunstock according to the invention is obtained according to a vacuum-bag moulding process combined with the use of shaped expanding cores and shaped inserts.

The process comprises the steps of:
providing a mould split into two half-moulds having each a recess with a shape being complementary to the external shape of one of the half-shells of the frame of the one-piece gunstock to be manufactured;
arranging at least one sheet of an advanced composite material comprising fibres and a resin in one of the half-moulds so as to fill in the recess of said half-mould without projecting therefrom;
arranging at least one sheet of an advanced composite material comprising fibres and a resin in the other half-mould so as to fill in the recess of the other half-mould and project from said recess;
inserting into said other half-mould at least one shaped expanding core and at least one shaped insert being adapted to define internal recesses of the frame of the gunstock to be manufactured;
coupling said half-moulds and inserting the resulting mould into a vacuum bag thereby obtaining the overlap of the sheets of advanced composite material arranged in said half-moulds;
generating vacuum in said vacuum bag so as to extract air from said mould;
curing the resin of the sheets in the mould kept under vacuum and allowing the expansion of the shaped expanding core for generating a pressure inside the mould, thus compacting the sheets inside the mould and obtaining said one-piece frame;
extracting said one-piece frame from the mould.

In the process in accordance with the above-described second embodiment, the expanding core can be any shaped object of a material having an expanding capacity. The material can be for example a resin having an expanding capacity which, when heated above a predetermined expansion temperature, is capable of chemically reacting releasing gases which provoke the core expansion, thus compacting the sheets inside the mould.

In the alternative process according to the invention, applying vacuum in the bag together with the pressure exerted on the sheets by the at least one shaped expanding core advantageously allows the recesses inside the frame to be defined and the sheets inside the mould to be compacted while preventing air bubbles from forming between the sheets of advanced composite material or removing possible already-formed air bubbles which would otherwise create imperfections in the final product affecting the quality thereof.

In the above-described processes, the step of generating vacuum can be performed by applying to the vacuum bag any reduced pressure (vacuum) which is adapted to extract air so as to prevent air bubbles from forming between the sheets of advanced composite material and/or to remove possible air bubbles already formed therebetween. The extent (value) of the reduced pressure can be suitably selected by the person skilled in the art based on his general technical knowledge depending on manufacturing requirements, features of the product to be obtained and/or other contingent and specific requirements.

In the above-described processes, the step of curing the resin, generating the pressure in the at least one bag, and expanding the at least one expanding core, if any, can be advantageously performed in an autoclave. The autoclave temperature and operating pressure can be also suitably selected by the person skilled in the art particularly based on the features of resin curing temperature and expanding core expansion temperature, if any, besides ensuring an appropriate overpressure (particularly a pressure which is higher than atmospheric pressure) inside the mould through the expansion of the expanding core, when used, or inside the bag or bags for obtaining the above-indicated benefits.

The described manufacturing processes allow to manufacture a frame of a gunstock of advanced composite material, preferably but not exclusively a material comprising carbon fibres, which is totally in one piece without any break between the fibres of advanced composite material composing it. Such a one-piece gunstock has a structure which is sturdy, compact, homogeneous and substantially devoid of imperfections, non-deformable, very light, and insensitive to humidity and temperature variations.

Advantageously this ensures a high resistance of the frame of the one-piece gunstock to the stresses caused by the vibrations generated during firing and an optimum distribution thereof, with positive effects on performances in terms of firing precision and reproducibility, on the lightweight during rifle transport, and on the rifle lifespan.

Moreover, the above-described manufacturing processes allow to manufacture a frame of a one-piece gunstock of advanced composite material, preferably a material comprising carbon fibre, with a high size precision of the internal shape of the recess and of the housing seats of the mechanical components inside the frame of the mould, and accordingly, they allow the mechanical components needed for firing to be housed without interposing resins or rubbers between said mechanical components and the internal walls of the frame of the one-piece gunstock 1.

This implies a distribution of the stresses caused by the vibrations generated during firing which is substantially homogeneous inside the single gunstocks and reproducible among the different gunstocks produced with the method.

Advantageously this also reduces the intrinsically unreproducible manual operations, which are needed for assembling the firearm and reduces the rifle assembling times to those needed for inserting the mechanical components, such as for example actions, tanks and barrel, and for fixing them by screws.

It should be noted that the above-described processes according to the invention prove to be also extremely versatile since the internal shape of the recess and of the housing seats of the mechanical components can be made not only with a high precision but also in several even complex specific design and/or implementation shapes, according to requirements.

In view of the above description the one-piece gunstock for rifle described in the present invention allows the drawbacks presented in the prior art to be deleted.

A person skilled in the art will be allowed to bring several modifications and alternatives to the one-piece gunstock for rifle and to the above-described manufacturing methods according to the invention, all however comprised in the scope of protection of the attached claims.

What is claimed is:

1. A process for manufacturing a one-piece gunstock for firearm, wherein the one-piece gunstock comprises a frame having two half-shells extended longitudinally and defining a recess inside the frame, a plurality of seats and a space for housing respective mechanical components formed between said half-shells and delimited by a transversal connection element of said half-shells,
   the process comprising the steps of:
   providing a mould split into two half-moulds having each a recess with a shape being complementary to the external shape of one of the half-shells of the frame of the one-piece gunstock to be manufactured;
   arranging at least one sheet of an advanced composite material comprising fibres and a resin in one of the half-moulds so as to fill in the recess of said half-mould without projecting therefrom;
   arranging at least one sheet of an advanced composite material comprising fibres and a resin in the other half-mould so as to fill in the recess of the other half-mould and project from said recess;
   inserting into said other half-mould at least one bag having an open end portion projecting from said other half-mould;
   inserting into said other half-mould at least one shaped insert being adapted to define internal recesses of the frame of the gunstock to be manufactured;
   coupling said half-moulds, keeping said open end portion of at least one bag outside the resulting mould and thereby obtaining the overlap of the sheets of advanced composite material arranged in said half-moulds;
   inserting said mould into a vacuum bag and arranging said open end portion of at least one bag in communication with the outside;
   generating vacuum in said vacuum bag so as to extract air from said mould;
   curing the resin of the sheets in the mould kept under vacuum and generating a pressure inside at least one bag through said open end portion thereof in communication with the outside so as to compact the sheets inside the mould, thus obtaining said one-piece frame;
   extracting said one-piece frame from the mould.

2. The process according to claim 1, wherein said fibres are selected from flax fibres, aramid fibres, glass fibres, polymer fibres, jute fibres, recycled carbon fibres, carbon fibres and combinations thereof.

3. The process according to claim 2, wherein said fibres consist of or comprise carbon fibres.

4. The process according to claim 1, wherein the frame has a back portion, a central portion and a front portion, wherein the central portion is internally shaped with said housing seats.

5. The process according to claim 4, wherein said half-shells have longitudinal flanges, transversal flanges and a back flaring in a housing seat, wherein the housing seat is arranged and adapted to hold a trigger assembly.

6. The process according to claim 2, wherein said half-shells have longitudinal flanges, transversal flanges and a front flaring in another housing seat, wherein the other housing seat is arranged and adapted to hold and support a tank for a removable magazine of the firearm.

7. The process according to claim 5, wherein said space is arranged above said housing seats and is intended to house the action of the firearm supported on said front flange and said back flange and anchored thereto by fixing means.

8. The process according to claim 7, wherein said front portion of the frame has an open recess extended longitudinally which is adapted to bear a rifle barrel, wherein the open recess is in communication with said housing seats.

9. The process according to claim 1, wherein at least one bag is arranged at least on most of the longitudinal extent of said other half-mould, preferably substantially along the whole longitudinal extent of said other half-mould.

10. A process for manufacturing a one-piece gunstock for firearm, wherein the one-piece gunstock comprises a frame having two half-shells extended longitudinally and defining a recess inside the frame, a plurality of seats and a space for housing respective mechanical components formed between said half-shells and delimited by a transversal connection element of said half-shells, the process comprising the steps of:
providing a mould split into two half-moulds having each a recess with a shape being complementary to the external shape of one of the half-shells of the frame of the one-piece gunstock to be manufactured;
arranging at least one sheet of an advanced composite material comprising fibres and a resin in one of the half-moulds so as to fill in the recess of said half-mould without projecting therefrom;
arranging at least one sheet of an advanced composite material comprising fibres and a resin in the other half-mould so as to fill in the recess of the other half-mould and project from said recess;
inserting into said other half-mould at least one shaped expanding core and at least one shaped insert being adapted to define internal recesses of the frame of the gunstock to be manufactured;
coupling said half-moulds and inserting the resulting mould into a vacuum bag thereby obtaining the overlap of the sheets of advanced composite material arranged in said half-moulds;
generating vacuum in said vacuum bag so as to extract air from said mould;
curing the resin of the sheets in the mould kept under vacuum and allowing the expansion of the shaped expanding core for generating a pressure inside the mould, thus compacting the sheets inside the mould and obtaining said one-piece frame;
extracting said one-piece frame from the mould.

11. The process according to claim 1, wherein said advanced composite material comprises carbon fibres and an epoxy resin.

12. The process according to claim 1, wherein said step of curing the resin is performed in an autoclave.

13. The process according to claim 10, wherein said step of expanding the expanding core is performed in an autoclave.

14. The process according to claim 2, wherein the aramid fibres comprise kevlar.

15. The process according to claim 2, wherein the polymer fibres comprise polyester fibres.

* * * * *